United States Patent
Schuster et al.

(10) Patent No.: US 9,139,993 B1
(45) Date of Patent: *Sep. 22, 2015

(54) TOILET FILL VALVE

(71) Applicant: Danco, Inc., Irving, TX (US)

(72) Inventors: Michael J. Schuster, Shorewood, IL (US); Larry Schneider, Wadsworth, IL (US)

(73) Assignee: Danco, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,424

(22) Filed: Jan. 27, 2014

Related U.S. Application Data (63) Continuation of application No. 13/346,355, filed on Jan. 9, 2012, now Pat. No. 8,650,671, which is a continuation of application No. 12/786,904, filed on May 25, 2010, now Pat. No. 8,104,105, which is a continuation of application No. 10/958,797, filed on Oct. 5, 2004, now Pat. No. 7,743,436, which is a continuation-in-part of application No. 10/798,606, filed on Mar. 11, 2004, now Pat. No. 6,823,889.

(51) Int. Cl.
*E03D 1/00* (2006.01)
*E03D 1/32* (2006.01)

(52) U.S. Cl.
CPC .......................................... *E03D 1/32* (2013.01)

(58) Field of Classification Search
CPC .......................................................... E03D 1/32
USPC ................ 4/331, 324, 366, 415, 675; 285/91; 137/15.26, 432, 434, 436, 437, 137/441–444
See application file for complete search history.

(56) References Cited

U.S. PATENT DOCUMENTS

| | | |
|---|---|---|
| 136,128 A | 2/1873 | Bralley |
| 994,746 A | 6/1911 | Dwyer |
| 996,743 A | 7/1911 | Yancey |
| 1,113,057 A | 10/1914 | Schumann |
| 1,787,601 A | 1/1931 | Swanberg |
| 2,087,503 A | 7/1937 | Clemmons |
| 2,465,866 A | 3/1949 | Gaines |
| 2,512,176 A | 6/1950 | Shaffer |
| 2,736,037 A | 2/1956 | Hardie |
| 2,791,235 A | 5/1957 | Smith |
| 2,799,865 A | 7/1957 | Schuster |
| 3,040,769 A | 6/1962 | Lamb |
| 3,086,546 A | 4/1963 | Brown |

(Continued)

OTHER PUBLICATIONS

US Patent 6,823,889, File History, 2004-2005 Great-Great-Grandparent Patent to this Application (copy not attached).

(Continued)

*Primary Examiner* — Tuan N Nguyen
(74) *Attorney, Agent, or Firm* — Thomas | Horstemeyer, LLP (57) ABSTRACT

In various embodiments, a water inlet of a toilet fill valve receives water from a water supply. A tank water outlet of the toilet fill valve provides a first portion of the water to a toilet tank. A bowl fill outlet port of the toilet fill valve provides a second portion of the water to a bowl fill restriction that is in direct contact with an extended portion of the toilet fill valve. The bowl fill restriction restricts the flow of the second portion of the water. The bowl fill restriction provides the second portion of the water to a tube that is in direct contact with the bowl fill restriction. The tube provides the second portion of the water to a toilet tank overfill tube.

20 Claims, 9 Drawing Sheets

(56) References Cited

U.S. PATENT DOCUMENTS

| | | |
|---|---|---|
| 3,172,128 A | 3/1965 | Ducey |
| 3,321,972 A | 5/1967 | Goldtrap |
| 3,457,947 A | 7/1969 | Fitzgerald |
| 3,744,064 A | 7/1973 | Preston |
| 3,762,395 A | 10/1973 | Taylor |
| 3,986,216 A | 10/1976 | Davis et al. |
| 3,994,628 A | 11/1976 | Kemper |
| 4,007,498 A | 2/1977 | Pearson |
| 4,017,916 A | 4/1977 | Pearson |
| 4,032,822 A | 6/1977 | Un |
| 4,090,532 A | 5/1978 | Story, Jr. |
| 4,134,164 A | 1/1979 | Sanmartin Rial |
| 4,145,775 A | 3/1979 | Butler |
| 4,351,071 A | 9/1982 | Clar |
| 4,392,260 A | 7/1983 | Bensen |
| 4,420,845 A | 12/1983 | Antunez |
| 4,505,231 A | 3/1985 | Syler |
| 4,527,295 A | 7/1985 | Lacore |
| 4,700,413 A | 10/1987 | Lopez |
| 4,707,867 A | 11/1987 | Kawabe et al. |
| 4,764,996 A | 8/1988 | Pino |
| 4,770,388 A | 9/1988 | Carman |
| 4,793,588 A | 12/1988 | Laverty, Jr. |
| 4,898,124 A | 2/1990 | Granberg et al. |
| 4,918,764 A | 4/1990 | Haselswerdt et al. |
| 4,980,932 A | 1/1991 | Stemples |
| 5,007,452 A | 4/1991 | Antunez |
| 5,036,553 A | 8/1991 | Sanderson |
| 5,052,060 A | 10/1991 | Makita et al. |
| 5,083,323 A | 1/1992 | Cannan |
| 5,134,729 A | 8/1992 | Shaw |
| 5,228,152 A | 7/1993 | Fraley |
| 5,232,011 A | 8/1993 | Royalty |
| 5,245,710 A | 9/1993 | Haselswerdt et al. |
| 5,327,931 A | 7/1994 | Royalty |
| 5,362,026 A | 11/1994 | Kobayashi et al. |
| 5,432,959 A | 7/1995 | Ellsworth et al. |
| 5,442,820 A | 8/1995 | Becker |
| 5,469,586 A | 11/1995 | Tsutsui et al. |
| 5,542,448 A | 8/1996 | Campbell et al. |
| 5,624,073 A | 4/1997 | Mueller et al. |
| 5,708,991 A | 1/1998 | DeMarco |
| 5,715,860 A | 2/1998 | Horad |
| 5,742,951 A | 4/1998 | Wright et al. |
| 5,775,366 A | 7/1998 | Ray |
| 5,794,279 A | 8/1998 | Schwartz |
| 5,862,537 A | 1/1999 | Osmond |
| 5,926,868 A | 7/1999 | Bjerke |
| 6,047,725 A | 4/2000 | Gish et al. |
| 6,202,227 B1 | 3/2001 | Gurowitz |
| 6,209,576 B1 | 4/2001 | Davis |
| 6,219,856 B1 | 4/2001 | Alles |
| 6,263,519 B1 | 7/2001 | Parsons et al. |
| 6,295,660 B1 | 10/2001 | Schuster |
| 6,385,788 B1 | 5/2002 | Wasielewski |
| 6,409,221 B1 | 6/2002 | Robinson et al. |
| 6,560,790 B2 | 5/2003 | Saar et al. |
| 6,823,889 B1 | 11/2004 | Schuster |
| 2002/0092090 A1 | 7/2002 | Johnson |
| 2002/0162166 A1 | 11/2002 | Saar et al. |
| 2004/0199989 A1* | 10/2004 | Trolio .................. 4/427 |

OTHER PUBLICATIONS

US Patent 7,743,436, File History, 2004-2010 Great-Grandparent Patent to this Application (copy not attached).

US Patent 8,104,105, File History, (2010-2012) Grandparent to this Application (copy not attached).

U.S. Appl. No. 13/346,355 File History (2012-2014) Parent to this Application (copy not attached).

* cited by examiner

TOILET FILL VALVE

CROSS REFERENCE TO RELATED APPLICATIONS

The present patent application is a Continuation Application of, and claims priority to, U.S. patent application entitled "Toilet Fill Valve with Adjustable Bowl Fill Flow" filed on Jan. 9, 2012 and assigned Ser. No. 13/346,355, which is a Continuation Application of, and claims priority to, U.S. patent application entitled "Toilet Fill Valve with Adjustable Bowl Fill Flow" filed on May 25, 2010 and assigned Ser. No. 12/786,904, which is a Continuation Application of, and claims priority to, U.S. Pat. No. 7,743,436 entitled "Toilet Fill Valve with Adjustable Bowl Fill Flow" filed on Oct. 5, 2004, which is a Continuation-in-Part Application of, and claims priority to, U.S. Pat. No. 6,823,889 entitled "Toilet Fill Valve with Adjustable Bowl Fill Flow" filed on Mar. 11, 2004.

BACKGROUND

A toilet fill valve in a toilet typically includes a water outlet that provides water for refilling a toilet bowl during a flush cycle. Unfortunately, the water flowing out of such conventional water outlets to fill a toilet bowl provide much more water than is necessary to fill the average toilet bowl. Consequently, much of the water that flows into a toilet bowl during the average flush cycle is lost down the drain. This translates into a loss of millions of gallons of water each year.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
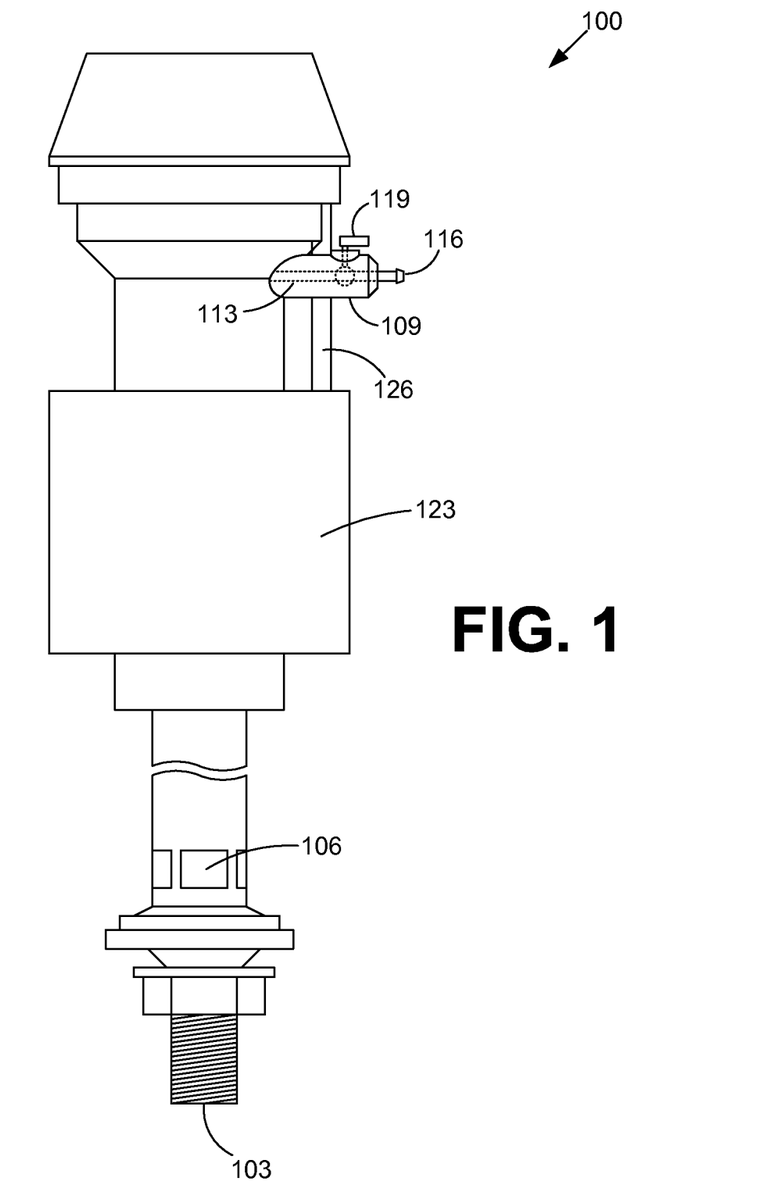
FIG. 1 is a drawing of a side view of a toilet fill valve according to an embodiment of the present invention.

With reference to FIG. 1, shown is a toilet fill valve 100 according to an embodiment of the present invention. The toilet fill valve 100 includes a water inlet 103 at the bottom of the toilet fill valve 100 that is configured to be coupled to a water source outside of a toilet tank within which the toilet fill valve 100 is installed. The toilet fill valve 100 includes one or more water outlets 106 that are configured to supply water into a toilet tank within which the toilet fill valve 100 is installed. The toilet fill valve 100 may be, for example, a pilot style fill valve. However, it is understood that the toilet fill valve 100 may be any style of fill valve such as, for example, a ballcock valve, etc. The toilet fill valve 100 also includes a bowl fill valve 109 according to an embodiment of the present invention. The bowl fill valve 109 includes a bowl fill valve inlet 113 and a bowl fill valve outlet 116. In addition, the bowl fill valve 109 includes a handle 119 that facilitates a manual adjustment of the bowl fill valve 109.

The bowl fill valve 109 is integral with the toilet fill valve 100. In this respect, the term "integral" refers to the fact that the bowl fill valve 109 and the toilet fill valve 100 comprise a single structure. In this respect, the bowl fill valve 109 may be included within the body of the toilet fill valve 100 as a portion of the toilet fill valve 100 in a single piece construction. Specifically, the bowl fill valve 109 may be molded as a portion of the toilet fill valve 100 or it may be snapped or clamped into place, or it may be attached to the toilet fill valve 100 in some other manner, etc.

Within the toilet fill valve 100, the bowl fill valve inlet 113 is operatively coupled to the water inlet 103. In this respect, when the toilet fill valve 100 is open and water flows from the water inlet 103 to the water outlets 106 and into a toilet tank, an amount of water is also supplied to the bowl fill valve inlet 113 that flows through the bowl fill valve 109 and out the bowl fill valve outlet 116. By virtue of the manual setting of the handle 119 of the bowl fill valve 109, the flow of water through the bowl fill valve 109 is regulated. In this manner, the flow of water is regulated so that enough water flows out of the bowl fill valve 109 to fill a toilet bowl without wasting any water down a drain.

Thus, the bowl fill valve 109 is configured to supply an adjustable flow of water out of the bowl fill outlet 116 that is directed to a toilet bowl during a flush cycle of a toilet to fill the toilet bowl. The flow of water is adjusted so that just enough flows out of bowl fill valve 109 so as to fill the toilet bowl without wasting any water.

The toilet fill valve 100 includes a float 123 that is operatively coupled to an actuating arm (not shown) by a translating stem 126. The float 123 floats on the water within a toilet tank and, depending on the location of the float 123 along the toilet fill valve 100, the toilet fill valve 100 is open or closed as can be appreciated by those with ordinary skill in the art. The bowl fill valve 109 and the actuating arm (not shown) are each located on the toilet fill valve 100 so as to prevent any interference between the bowl fill valve 109 and the translational stem 126 or the actuating arm as will be discussed.

According to an embodiment of the present invention, the bowl fill valve 109 may include a number of biased positions. In this respect, the movement of the handle 119 may cause the bowl fill valve 109 to move from one predefined biased position to other predefined biased positions. In this respect, various mechanisms such as tabs, snaps, or other position biasing structures may be employed. The biased positions of the bowl fill valve 109 help ensure that the bowl fill valve 109 remains in a given setting selected by a user by a manual manipulation of the handle 119 during the normal course of operation of the toilet fill valve 100. Thus, by virtue of the biased positions, the bowl fill valve 109 is prevented from moving out of a desired position set by a user over a long period of use due to vibration and other factors as can be appreciated by those with ordinary skill in the art.

The bowl fill valve 109 may be, for example, a ball valve, a gate valve, a globe valve, a plug valve, a diaphragm valve, a butterfly valve, a needle valve, a sliding gate, a quick turn valve, a knife valve or any other appropriate type of valve as can be appreciated by those with ordinary skill in the art.

To operate the toilet fill valve 100, the toilet fill valve 100 is first installed within a toilet tank. When a toilet is flushed and the tank is drained, the float 123 moves downward along the toilet fill valve 100 and, consequently, the toilet fill valve 100 opens to allow water to flow from the water inlet 103 and out the water outlets 106 into a toilet tank. At the same time, water flows into the bowl fill valve inlet 113 and out the bowl fill valve outlet 116 through the bowl fill valve 109. Based on the setting of the handle 119, the bowl fill valve 109 determines the precise flow rate of the water that flows out the bowl fill valve outlet 116. A tube is typically employed to direct the water flowing out the bowl fill valve outlet 116 to an overflow tube in the toilet tank. In this respect, the water flowing out the bowl fill valve outlet 116 refills the toilet bowl of the respective toilet.

Figure 2:
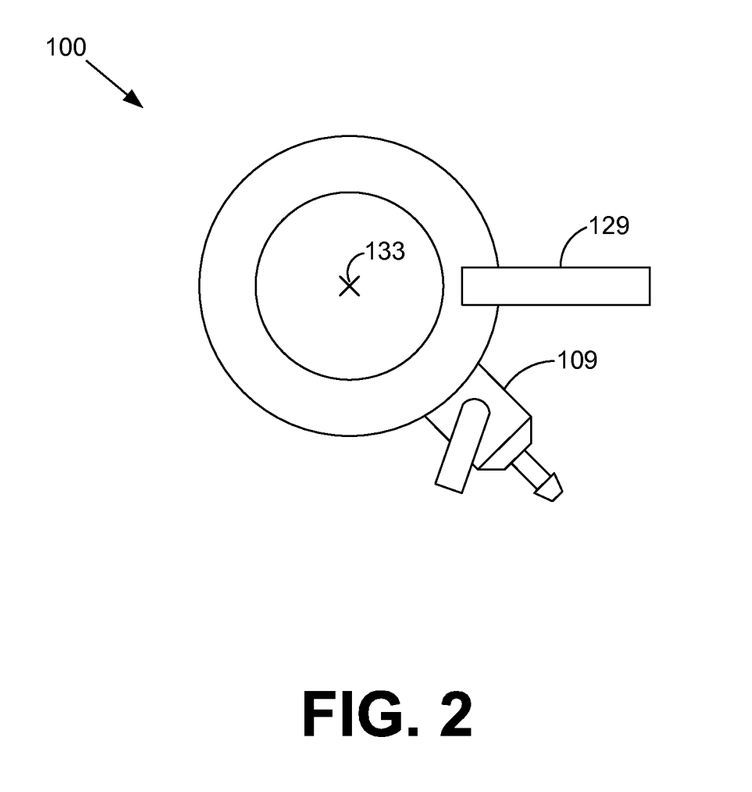
FIG. 2 is a drawing of a top view of the toilet fill valve of FIG. 1.

Referring next to FIG. 2, shown is a top view of the toilet fill valve 100 according to an embodiment of the present invention. In this respect, the actuating arm 129 of the bowl fill valve 100 is seen with respect to the bowl fill valve 109. The actuating arm 129 is coupled to the float by way of the translational stem 126 (FIG. 1). In this respect, the actuating arm 129 extends in an orthogonal direction relative to a longitudinal axis 133 of the toilet fill valve 100. The longitudinal axis 133 is centered in the toilet fill valve 100 along the length of the toilet fill valve 100. Also, the bowl fill valve 109 extends in an orthogonal direction relative to the longitudinal axis 133 of the toilet fill valve 100. In order to prevent interference between the bowl fill valve 109 and the translational stem 126 or the actuating arm 129, the actuating arm 129 is angularly offset relative to the bowl fill valve 109 as shown. In this respect, the translational stem 126 is coupled to the free end of the actuating arm 129. By virtue of the angular offset between the bowl fill valve 109 and the actuating arm 129, the operation of the bowl fill valve 109 does not interfere with the operation of the toilet fill valve 100 itself by virtue of the fact that the float 123 (FIG. 1) can move freely with the movement of the translational stem 126 in order for proper operation of the toilet fill valve 100.

Figure 3:
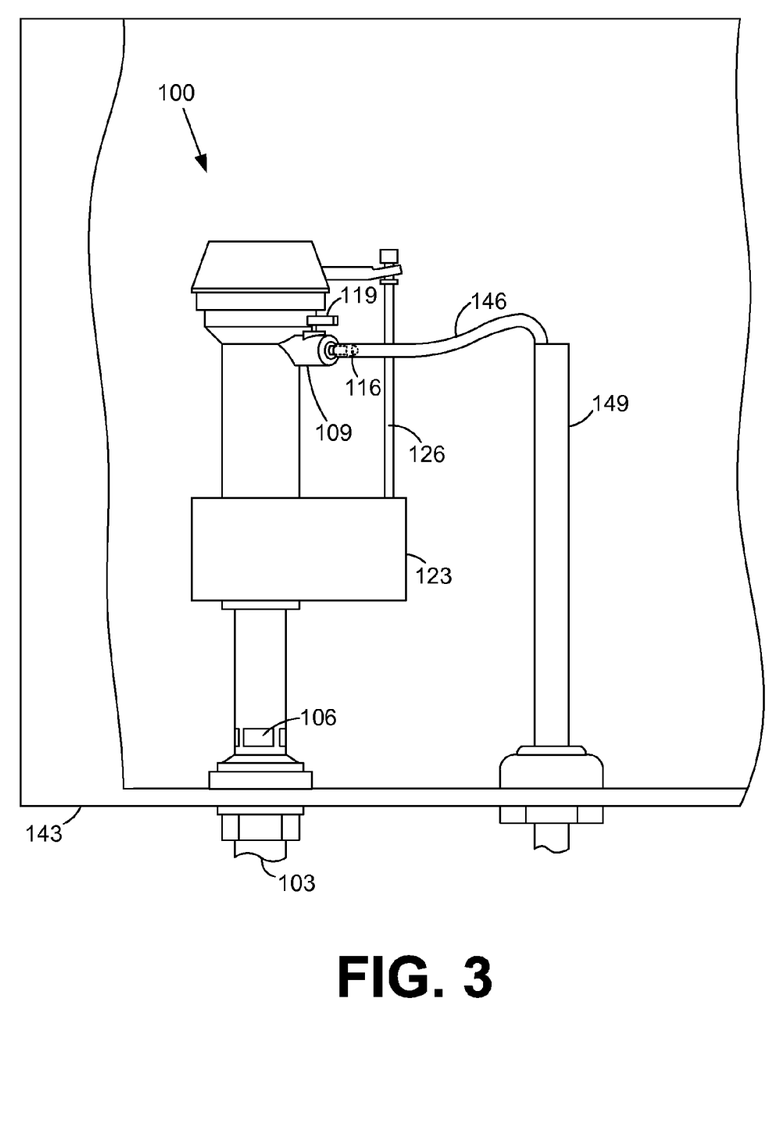
FIG. 3 is a drawing of a cutaway view of a toilet tank within which the toilet fill valve of FIG. 1 is installed.

With reference to FIG. 3, shown is the toilet fill valve 100 as installed within a toilet tank 143 according to an embodiment of the present invention. In this respect, the toilet fill valve 100 includes the water inlet 103 that is coupled to a water source outside of the toilet tank 143. The toilet fill valve 100 also includes one or more water outlets 106 that direct a flow of water into the toilet tank 143 during the operation of a flush cycle. The bowl fill valve 109 includes the bowl fill valve inlet (not shown) and the bowl fill valve outlet 116, where the bowl fill valve inlet is operatively coupled to the water inlet 103 as described above. Also, the bowl fill valve 109 is integrated with the body of the toilet fill valve 100 as described above.

A tube 146 is coupled to the bowl fill valve outlet 116 and is directed into the overflow tube 149 of the toilet tank 143. The tube 146 directs water that flows out of the bowl fill valve outlet 116 into the overflow tube 149 and refills the toilet bowl associated with the toilet tank 143 as can be appreciated by those with ordinary skill in the art. The bowl fill valve 109 is configured to supply the adjustable flow of water out the bowl fill valve outlet through the tube 146 and into the overflow tube 149 for filling the toilet bowl during the flush cycle of the toilet. In this respect, no pressure is seen within the tube 146. Specifically, the fact that the bowl fill valve 109 is integral with the toilet fill valve 100 prevents the creation of a pressure head in the tube 146 as would be the case if the bowl fill valve 109 were included in the middle of the tube 146. The fact that a pressure head is not created in any portion of the tube 146 prevents the tube 146 from working its way off of the bowl fill valve outlet 116 over time.

When installed, the bowl fill valve 109 is calibrated for the particular flush cycle of the toilet within which the toilet fill valve 100 is installed. To calibrate the bowl fill valve 109, a user first determines the water level in the toilet bowl when the toilet bowl is full of water. This gives the user a starting and an ending point for determining when the toilet bowl of the respective toilet is full. Next, the bowl fill valve handle 109 is adjusted so that the bowl fill valve 109 is placed in a predefined position that allows a predefined flow of water to refill the toilet bowl. In this manner, one adjusts the actual flow of water that refills the toilet bowl. Thereafter, the user flushes the toilet itself. Next, the user determines if the flow of water into the toilet bowl by virtue of the adjustments made to the bowl fill valve 109 is adequate to refill the toilet bowl during the flush cycle. This may be determined, by identifying whether the level of the water in the toilet bowl reaches the full level determined at the beginning of the bowl fill valve calibration above.

The flow of water from the bowl fill valve 109 should be set so as to ensure that the water level in the toilet bowl reaches the full level at about the same time that the flush cycle ends. In other words, the level of water in the toilet bowl should reach its highest level at the same time that the flush cycle ends. This prevents any water from being lost down the drain associated with the toilet.

If the amount of water that flows into the toilet bowl is inadequate to refill the toilet bowl during the flush cycle as described above, then one should repeat the steps of adjusting the bowl fill valve, flushing the toilet, and then once again determining if the flow of water into the toilet bowl is adequate to refill the toilet bowl during a flush cycle.

Ultimately, during use of the toilet that includes the toilet fill valve 100 and the toilet tank 143, a user flushes the toilet and a predetermined flow of water exits the bowl fill valve outlet 116 and is directed into the toilet bowl. After the toilet tank has drained during the flush cycle, a flapper closes in the toilet tank and the toilet tank refills. During the refilling of the tank, the water supplied by the bowl fill valve 109 fills the toilet bowl itself. The amount of water supplied by the bowl fill valve in the time it takes to refill the toilet tank should be approximately equal to the amount of water needed to fill the toilet bowl. By virtue of the fact that the bowl fill valve 100 is integrated within the toilet fill valve 100, a pressure head is prevented from being created due to any potential pinching of the tube 146 or other similar adjustment mechanism.

Figure 4:
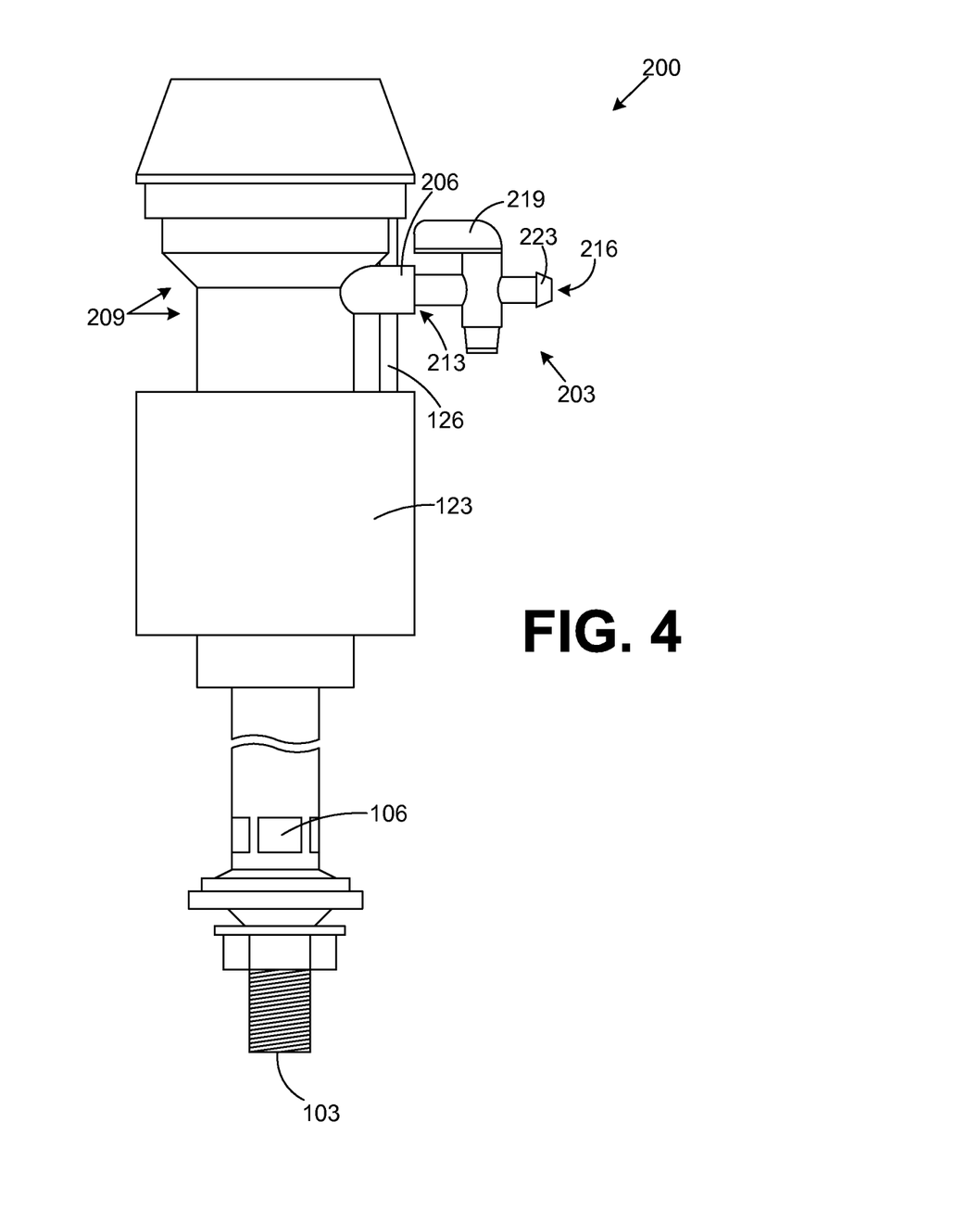
FIG. 4 is a drawing of a side view of a toilet fill valve according to an embodiment of the present invention.

With reference to FIG. 4, shown is a toilet fill valve 200 according to another embodiment of the present invention. The toilet fill valve 200 includes the same water inlet 103 and the water outlets 106 as the toilet fill valve 100 (FIG. 1). The toilet fill valve 200 also includes the float 123 and the translational stem 126 as was described with reference to the toilet fill valve 100. In addition, the toilet fill valve 200 includes a bowl fill valve 203 that is integral with the toilet fill valve 200 as will be described. As stated above, the term "integral" refers to the fact that the bowl fill valve 200 and the toilet fill valve 100 comprise a single structure. In this embodiment, the bowl fill valve 200 is a separate component that is attached the body of the toilet fill valve 100, thereby forming the integral, single structure.

The toilet fill valve 200 also includes a bowl fill outlet port 206 that radially extends from a portion of a body 209 of the toilet fill valve 200. In this respect, the bowl fill outlet port is operatively coupled to the water inlet 103. In particular, when the toilet fill valve 200 is in an "on" state, water that flows in the water inlet 103 flows out of both the water outlets 106 and the bowl fill outlet port 206. The water flowing out of the bowl fill outlet port 206 flows through the bowl fill valve 203 as will be described.

The bowl fill valve 203 includes a bowl fill valve inlet port 213 and a bowl fill valve outlet port 216. The bowl fill valve inlet port 213 is compatible with the bowl fill outlet port 206, where the bowl fill valve inlet port 213 is coupled to the bowl fill outlet port 206 when the bowl fill valve 203 is coupled or affixed to the toilet fill valve 200. The bowl fill valve inlet port 213 is compatible with the bowl fill outlet port 206 in the sense that both the bowl fill valve inlet port 213 and the bowl fill outlet port 206 comprise various structures that couple together when the bowl fill valve 203 is connected to the bowl fill outlet port 206 as will be described. In particular, various embodiments of the coupling between the bowl fill valve inlet port 213 and the bowl fill outlet port 206 are described herein.

The bowl fill valve 203 also includes a handle that may be adjusted by hand to adjust a flow of water through the bowl fill valve 203 during a flush operation of a toilet in which the toilet fill valve 200 is installed. Typically, the handle 219 is initially adjusted to a desired position when the toilet fill valve 200 is installed and generally remains in such position for the continued operation of the toilet fill valve 200. During the life cycle of the bowl fill valve 203, it may be possible that the bowl fill valve 203 is adjusted to take into account various changes in the operation of the toilet fill valve 200 such as, for example, changes in pressure or other operational changes.

The bowl fill valve 203 also includes a nipple 223. The nipple 223 is adapted to mate with a tube that extends from the bowl fill valve outlet port 216 to the overfill tube 149 (FIG. 3) in a manner similar to that as shown in FIG. 3 with respect to the tube 146 (FIG. 3) that extends from the nipple 116 (FIG. 3) to the overflow tube 149 (FIG. 3). The bowl fill valve 203 extends beyond the bowl fill outlet port 206 in a radial direction with respect to the portion of the body 209 of the toilet fill valve 200.

In some embodiments, the bowl fill outlet port 206 may comprise a female receptacle and, correspondingly, the bowl fill valve inlet port 213 may comprise a male end compatible with the female receptacle. Alternatively, the bowl fill valve inlet port 213 may comprise a female receptacle and the bowl fill outlet port 206 may comprise a male end compatible with such female receptacle.

The toilet fill valve 200 further includes an actuating arm (not shown) that extends in a radial direction that is orthogonal relative to a longitudinal axis of the toilet fill valve 200 in a manner similar as that described with reference to the toilet fill valve 100 (FIG. 1). The longitudinal axis is defined as an axis that runs from the water inlet 103 through the body 209 of the toilet fill valve 200 and out the top of the toilet fill valve 200. In one embodiment, the bowl fill valve 203 extends radially in an orthogonal direction relative to such longitudinal axis of the toilet fill valve 200. Also, in one embodiment, the actuating arm is angularly offset relative to the bowl fill valve 203 to prevent interference between the bowl fill valve 203 and the translational stem 126 that extends from the float 123 to a free end of the actuating arm. This allows the float 123 to move up and down and to engage the actuating arm during the normal operation of the toilet fill valve 200 during various flush cycles.

In addition, the bowl fill valve 203 may be constructed with a number of biased positions that help prevent the bowl fill valve 203 from moving out of adjustment over time when the force of pressure develops therein. Also, the biased positions aid a user in actual adjustment of the bowl fill valve 203 as can be appreciated.

The toilet fill valve 200 provides an advantage in that the body 209 of the toilet fill valve 200 may be constructed with the bowl fill outlet port 206 using a molding process that is much less complex than attempting to mold the entire bowl fill valve 203 within the structure of the body 209 as a single molded construction as was described with reference to one embodiment of the toilet fill valve 100. In this regard, the bowl fill valve 203 may be constructed as a separate component to the body 209 of the toilet fill valve 200 and assembled for distribution to end users.

Due to the fact that the bowl fill valve 203 is affixed to the toilet fill valve 200 through the coupling of the bowl fill outlet port 206 with the bowl fill valve inlet port 213, then a pressure head that develops within the bowl fill valve 203 due to the adjustment of the handle 219 during operation of the toilet fill valve 200 will not cause the bowl fill valve 203 to fall off of the toilet fill valve 200. Thus, when the toilet fill valve 200 is installed in a toilet tank 143, a user may adjust the opening of the bowl fill valve 203 by adjusting the handle 219 until a desired flow of water flows out of the bowl fill valve outlet port 216 into a tube and into the overflow tube 149 of a toilet. This flow of water is typically established to refill a toilet bowl of a toilet. In this regard, the flow of the water into the overflow tube 149 that refills the toilet bowl during a toilet flush operation may be regulated or adjusted so as to minimize or eliminate the amount of water that is lost down the drain of a toilet due to over filling of the toilet bowl during a flush cycle of a toilet. In one embodiment, the bowl fill valve 203 is adjusted until the filling of the toilet bowl of the toilet coincides with the end of the flush cycle, thereby resulting in little or no loss of water.

Figure 5A:
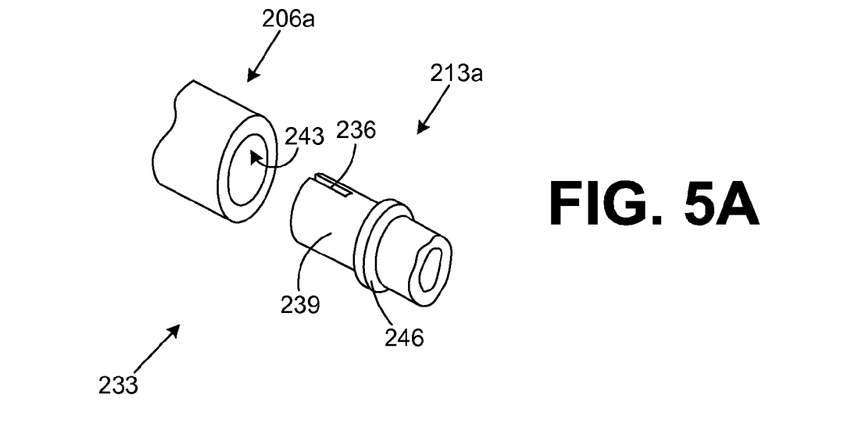
FIGS. 5A and 5B are drawings that illustrate one example of a coupling of a bowl fill valve to the toilet fill valve of FIG. 4 according to an embodiment of the present invention.

Referring next to FIG. 5A, shown is a coupling 233 between one embodiment of the bowl fill outlet port 206, denoted herein as bowl fill outlet port 206a, and an embodiment of the bowl fill valve inlet port 213, denote herein as bowl fill valve inlet port 213a. The bowl fill valve inlet port 213a includes a slot 236 in a side wall 239. The bowl fill outlet port 206a comprises a rib (not shown) that extends from a side wall 243 that is inserted into the slot 236 when the bowl fill inlet port 213a is inserted into the bowl fill outlet port 206a. The mating of the slot 236 with the rib prevents the rotation of the bowl fill valve 213a with respect to the bowl fill outlet port 206a when the bowl fill valve inlet port 213a is inserted into the bowl fill outlet port 206a. Alternatively, there may be a number of slots 236 in the side wall 239 of the bowl fill valve inlet port 213a and a corresponding number of ribs extending from the side wall 243 of the bowl fill outlet port 206a.

The bowl fill valve inlet port 213a also includes an annular protrusion 246 that extends from the side wall 239 of the bowl fill valve inlet port 213a. Correspondingly, an annular groove (not shown) in the side wall 243 of the bowl fill valve outlet port 206a is provided that mates up with the annular protrusion 246 when the bowl fill valve inlet port 213 is inserted into the bowl fill outlet port 206a. In this respect, the annular protrusion 246 is snap fit into the annular groove (not shown), thereby affixing the bowl fill valve 203a to the bowl fill valve outlet port 206a.

Figure 5B:
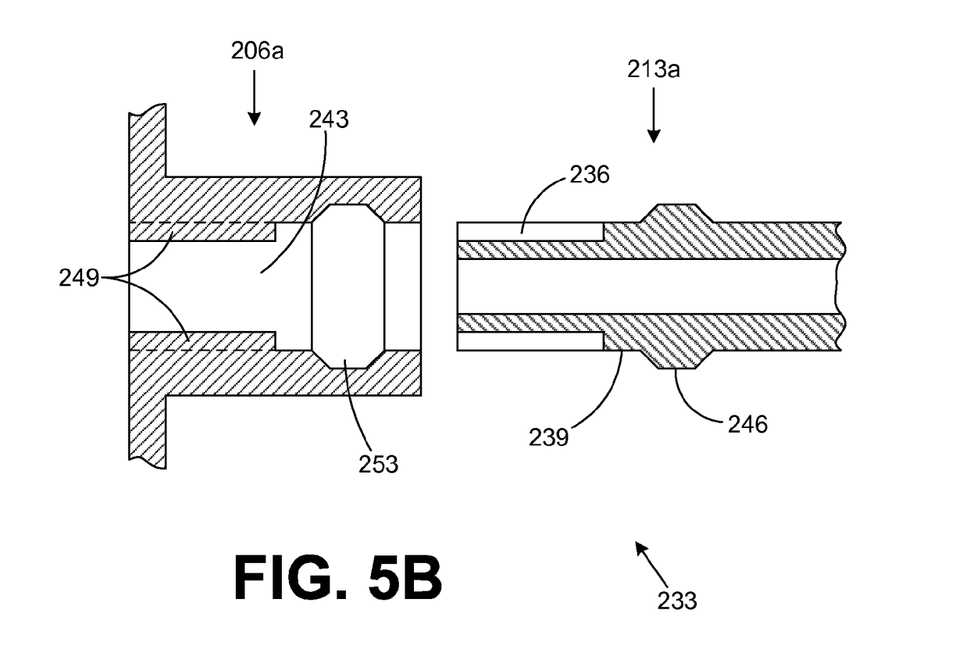

Turning then to FIG. 5B, shown is a cutaway view of the coupling 233 between the bowl fill outlet port 206a and the bowl fill valve inlet port 213a according to an embodiment of the present invention. In this respect, the bowl fill outlet port 206a is depicted with two ribs 249 extending from the side wall 243 within the bowl fill outlet port 206a. Also, the bowl fill outlet port 206a includes the annular groove 253 into which the annular protrusion 246 snaps when the bowl fill valve inlet port 213a is inserted into the bowl fill outlet port 206a. In this respect, the mating of the annular protrusion 246 with the annular groove 253 fixes the bowl fill valve 203 to the bowl fill outlet port 206a. In this respect, the bowl fill valve 203 becomes an integral portion of the toilet fill valve 200.

Also, the fit between the annular protrusion 246 is a snug fit that forms a seal between the bowl fill outlet port 206a and the bowl fill valve inlet port 213a that prevents the leakage of water from the coupling 233 during a flush cycle. Alternatively, a snug fit may occur between other mating surfaces of the bowl fill outlet port 206a and the bowl fill valve inlet port 213a that prevents leakage of water from the coupling 233.

With reference to FIGS. 5A and 5B, even though the slots 236 are depicted as being formed within the side wall 239 of the bowl fill valve inlet port 213 and the ribs 249 extend from the side wall 243 within the bowl fill outlet port 206, it is possible that this arrangement may be reversed where the slots 236 are formed in the side wall 243 of the bowl fill outlet port 206a and the ribs 249 extend from the side wall 239 of the bowl fill valve inlet port 213a. In addition, the annular groove 253 may be created in the side wall 239 of the bowl fill valve inlet port 213 and the annular projection 246 may extend inward from the side wall 243 within the bowl fill outlet port 206 in a reverse arrangement than that shown with reference to FIG. 5B.

Figure 6A:
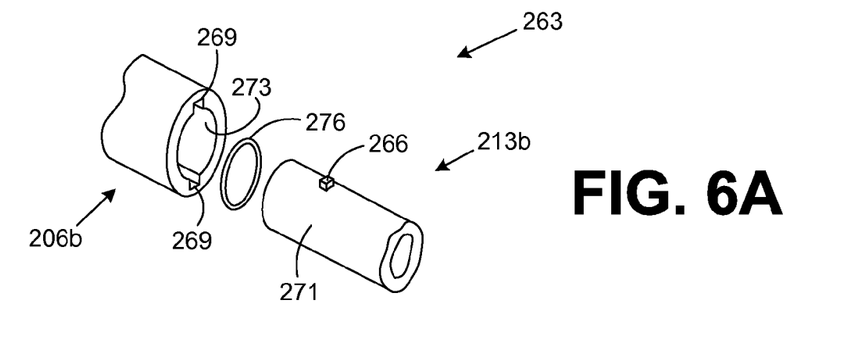
FIGS. 6A, 6B, and 6C are drawings that illustrate another example of a coupling of a bowl fill valve to the toilet fill valve of FIG. 4 according to an embodiment of the present invention.
Figure 6B:
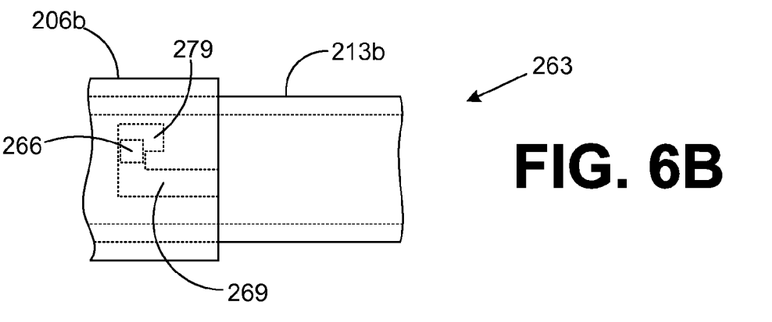
Figure 6C:
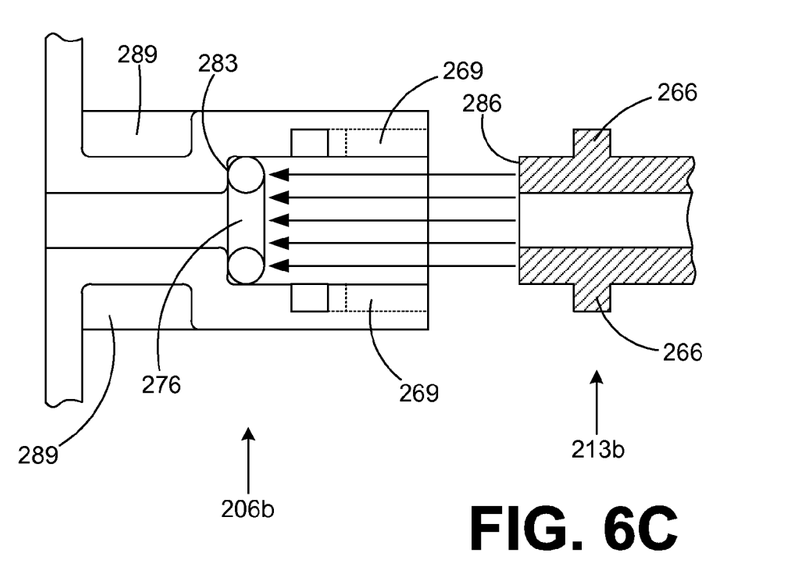

Referring next to FIGS. 6A, 6B, and 6C, shown is a coupling 263 between another embodiment of the bowl fill outlet port 206, denoted herein as bowl fill outlet port 206b, and another embodiment of the bowl fill valve inlet port 213, denoted herein as bowl fill valve inlet port 213b. The bowl fill valve inlet port 213b includes at least two locking ears 266 that mate with corresponding locking grooves 269 in the bowl fill outlet port 206b. In particular, the locking ears 266 extend from a side wall 271 of the bowl fill valve inlet port 213b. The locking grooves 269 are disposed in the side wall 273 of the bowl fill outlet port 206b. When the bowl fill valve 203 is inserted and twisted into the bowl fill outlet port 206b, each of the locking ears 266 is situated in a locking position of one of the locking grooves 269 as will be described. The coupling 263 further comprises a sealing ring 276 that may be, for example, a rubber O-ring or other type of sealing ring. The sealing ring 276 is compressed between an end of the bowl fill valve inlet port 213b and a seat within the bowl fill outlet port 206b as we described. While at least two locking ears 266 and corresponding locking grooves 269 are shown, it is possible that a design may be employed that comprises a single locking ear 266 and a single corresponding locking groove 269.

With reference to FIG. 6B, shown is a portion of the bowl fill valve inlet port 213b and the bowl fill outlet port 206b as the bowl fill valve inlet port 213b is inserted into the bowl fill outlet port 206b and is partially rotated such that the locking ears 266 are almost located in the locking positions 279. In this respect, each of the locking grooves 269 is a "J" formation. The J formation of the locking grooves 269 allows the locking ears 266 to slide down and around the partial loop of the J and seat in the locking position 279 such that the sealing ring 276 exerts a force against the end of the bowl fill valve inlet port 213b, thereby pushing the locking ears 266 into the locking positions 279 of the locking grooves 269 and holding the locking ears 266 in place. This ensures that the bowl fill valve 203 remains coupled to the bowl fill outlet port 206b.

With reference to FIG. 6C, shown is a cutaway view of the coupling 263 between the bowl fill outlet port 206b and the bowl fill valve inlet port 213b. In this respect, the bowl fill valve inlet port 213b is inserted into the bowl fill outlet port 206b in a manner such that the locking ears 266 mate with the locking grooves 269. When the locking ears 266 reach the bottom of the "J" of the locking grooves 269, then the bowl fill valve 203 is rotated so that the locking ears 266 may be seated in the locking positions 279.

The sealing ring 276 is seated against a portion of the bowl fill outlet port 206b. In one embodiment, this portion is a seating face 283 of the bowl fill outlet port 206b. Also, a portion of the bowl fill valve inlet port 213b is mated against the sealing ring 276. In one embodiment, this portion of the bowl fill valve inlet port 213b is an end face 286 such that the sealing ring is clamped between the seating face 283 and the end face 286 when the bowl fill valve inlet port 213b is inserted fully into the bowl fill outlet port 206b. The clamping or compression of the sealing ring 276 pushes the locking ears 266 into the locking position 279 of the locking grooves 269 once the bowl fill valve 203 is rotated accordingly. In this respect, the compressive force of the sealing ring 276 helps keep the bowl fill valve inlet port 213b of the bowl fill valve 203 mated with the bowl fill outlet port 206b. Also, the sealing ring 276 forms a seal between the bowl fill outlet port 206b and the bowl fill valve inlet port 213b that prevents leakage of water from the coupling 263 between the bowl fill outlet port 206b and the bowl fill valve inlet port 213b.

The locking positions 279 of the locking grooves and the locking ears 266 are located such that when the bowl fill valve 203 is rotated thereby positioning the locking ears 266 in the locking positions 279, the bowl fill valve 203 is substantially upright. In addition, the bowl fill outlet port 206b includes structural ribs 289 that provide greater structural stability for the bowl fill outlet port 206b and its attachment to the portion of the body 209 of the toilet fill valve 200 (FIG. 4). Alternatively, the bowl fill outlet port 206b may be attached without the structural ribs 289. In addition, it may be the case that the locking ears 266 extend inward from the side wall 273 of the bowl fill outlet port 206b and that the locking grooves 269 be situated within the side wall 271 of the bowl fill valve inlet port 213b.

Figure 7:
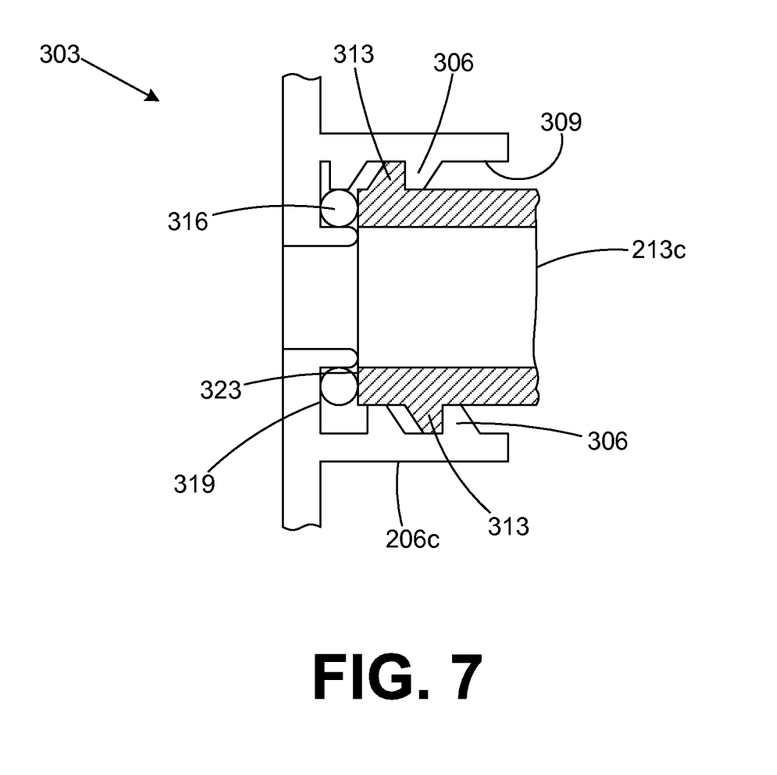
FIG. 7 is a drawing that illustrates still another example of a coupling of a bowl fill valve to the toilet fill valve of FIG. 4 according to an embodiment of the present invention.

Referring next to FIG. 7, shown is a cutaway view of a coupling 303 between a third embodiment of the bowl fill outlet port 206, denoted herein as bowl fill outlet port 206c and the bowl fill valve inlet port 213 denoted herein as bowl fill valve inlet port 213c. In this respect, the bowl fill outlet port 206c includes a first thread 306 disposed on a side wall 309 of the bowl fill outlet port 206c. A second thread 313 is disposed on a side wall of the bowl fill valve inlet port 213c that engages the first thread 306 disposed in the side wall of the bowl fill outlet port 206c. The bowl fill valve inlet port 213c is coupled to the bowl fill outlet port 206c by way of the first and second threads 306 and 313. Specifically, the bowl fill valve 203 may be screwed onto the bowl fill outlet port 206c by virtue of the threads 306 and 313. When the bowl fill valve inlet port 213c is screwed into the bowl fill valve outlet port 206c, a sealing ring 316 is clamped between portions of the bowl fill valve inlet port 213c and the bowl fill outlet port 206c such as a seating face 319 of the bowl fill outlet port 206c and an end face 323 of the bowl fill valve inlet port 213c. In this respect, a seal is formed between the bowl fill outlet port 206c and the bowl fill valve inlet port 213c. Alternatively, the threads 306 and 313 may be specified so as to form an adequate seal between the bowl fill valve outlet port 206c and the bowl fill valve inlet port 213c for purposes of preventing leakage. As an additional alternative, the seating face 319 and the end face 323 or other portions of the bowl fill valve inlet port 213c and the bowl fill outlet port 206c may be compressed together to form a seal to prevent leakage. Alternatively, the bowl fill outlet port 206c and the bowl fill valve inlet port 213c may be designed to include mating surfaces that perform a friction seal as can be appreciated.

Figure 8A:
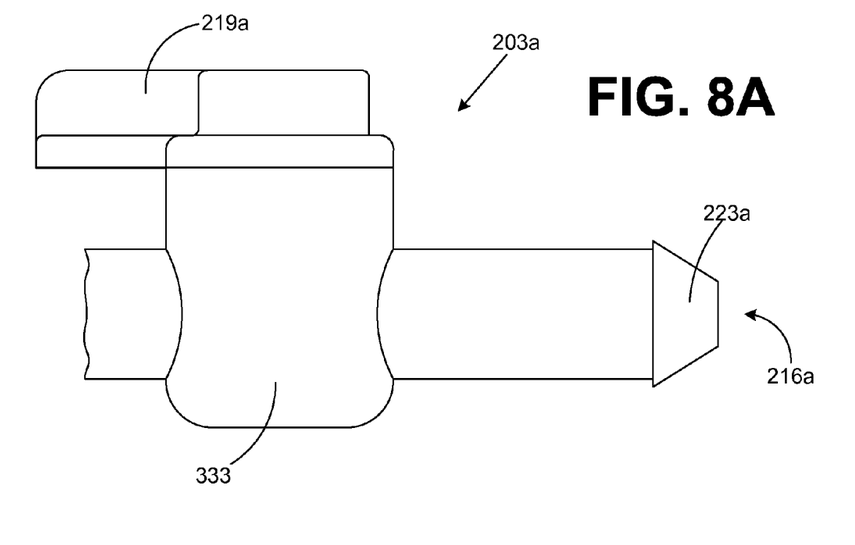
FIGS. 8A and 8B are drawings that illustrate an example of a bowl fill valve that is coupled to the toilet fill valve of FIG. 4 according to an embodiment of the present invention.

Referring next to FIG. 8a, shown is one embodiment of the bowl fill valve 203, denoted herein as bowl fill valve 203a according to an embodiment of the present invention. The bowl fill valve 203a includes a handle 219a and a valve body 333. The bowl fill valve 203a includes the bowl fill valve outlet port 216a and the bowl fill valve inlet port (not shown) the bowl fill outlet port 216a includes a nipple 223a.

Figure 8B:
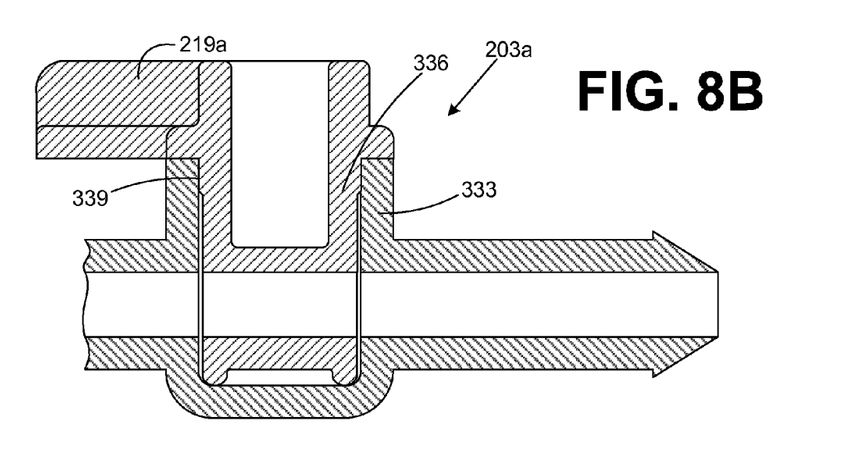

Referring then to FIG. 8b, shown is a cutaway view of the bowl fill valve 203a according to an embodiment of the present invention. In this respect, the valve body 333 forms a cavity within which a valve 336 is inserted as shown. A line contact 339 is formed between surfaces of the valve body 333 and the valve 336 so as to both hold the valve 336 within the cavity that is formed by the valve body 333 and to form a seal between the valve body 333 and the valve 336 to prevent water leakage. As seen, the valve 336 is integrated with the handle 219a in a single piece construction, although multiple piece construction may be employed.

Figure 9A:
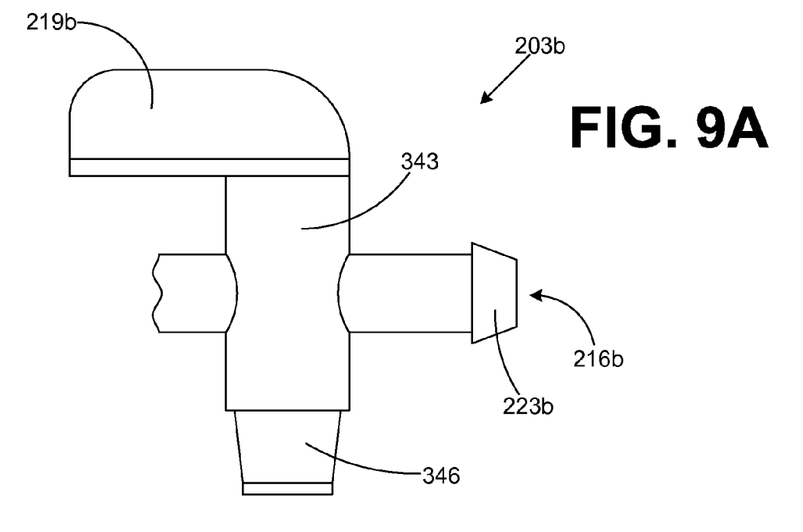
FIGS. 9A and 9B are drawings that illustrate another example of a bowl fill valve that is coupled to the toilet fill valve of FIG. 4 according to an embodiment of the present invention.
Figure 9B:
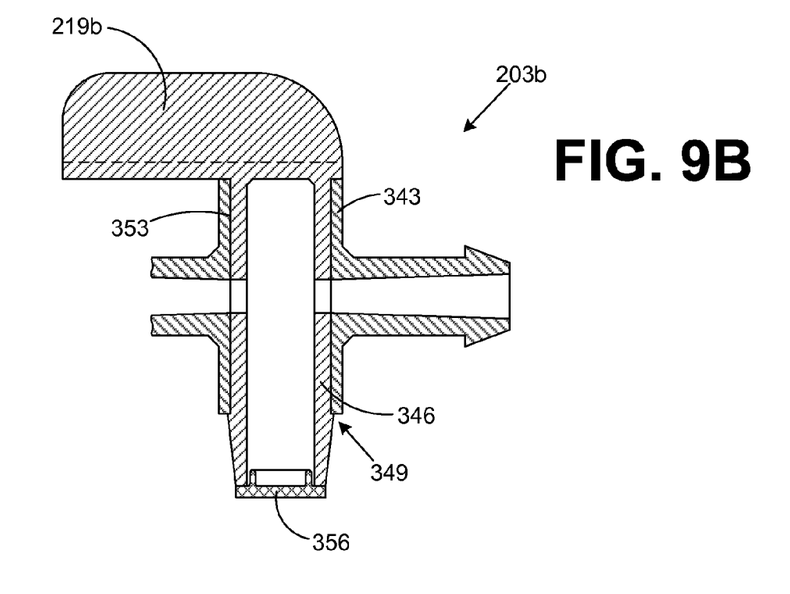

With reference to FIGS. 9a and 9b, shown is a second embodiment of the bowl fill valve 203, denoted herein as bowl fill valve 203b according to an embodiment of the present invention. The bowl fill valve 203b includes a valve body 343 within which is inserted a valve 346. The bowl fill valve 203b further comprises the bowl fill valve outlet port 216b and a bowl fill valve inlet port (not shown). The bowl fill valve outlet port 216b includes a nipple 223b. The bowl fill valve 203b further includes a handle 209b for manual adjustment of the bowl fill valve 203b.

Referring next to FIG. 9b, shown is a cutaway view of the bowl fill valve 203b according to an embodiment of the present invention. As shown, the valve 346 is inserted into the valve body 343. A snap fit 349 affixes the valve 346 within the valve body 343. A seal is formed by virtue of an interference fit 353 between a surface of the valve 346 and an inner surface of the valve body 343. The bottom of the cavity within the valve 346 is closed by a cap 356 that may be spin welded onto the valve 346 after the valve is inserted into the valve body 343.

In addition, referring back to FIG. 4, other types of couplings may be employed between the bowl fill outlet port 206 the bowl fill valve inlet port 213. For example, the bowl fill outlet port 206 the bowl fill valve inlet port 213 may be configured to facilitate a compression fitting there between. Also, other snap fit and sealing configurations may be employed beyond those specifically described herein.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A system, comprising:
   a toilet fill valve that comprises:
      a body comprising an extended portion, wherein the extended portion is integrally molded with the body, wherein the extended portion forms a bowl fill outlet port;
      a water inlet configured to receive water from a water source; and
      a tank water outlet configured to provide a first portion of the water to a toilet tank during at least a portion of a flush cycle;
   a water flow regulator configured to attach directly to the extended portion of the body, wherein a portion of the water flow regulator is configured to insert into, and come into contact with, the extended portion of the body, wherein the water flow regulator is configured to receive a second portion of the water from the bowl fill outlet port during at least a portion of the flush cycle, wherein the water flow regulator is configured to constrict a flow rate of the second portion of the water that flows through the water flow regulator; and
   a tube that is configured to attach directly to the water flow regulator, wherein the tube is configured to direct the second portion of the water from the water flow regulator directly to a toilet tank overflow tube.

2. The system of claim 1, wherein the extended portion of the body extends radially from a longitudinal axis of the toilet fill valve.

3. The system of claim 1, wherein the water flow regulator is configured to be clamped to the toilet fill valve.

4. The system of claim 1, wherein the water flow regulator is configured to be snapped onto the toilet fill valve.

5. The system of claim 1, wherein the toilet fill valve further comprises:
   a float; and
   an actuating arm coupled to the float, wherein the actuating arm extends radially relative to a longitudinal axis of the toilet fill valve, wherein the actuating arm is angularly offset relative to the bowl fill valve, thereby preventing an interference with the water flow regulator and a translational stem that extends from the float to a free end of the actuating arm.

6. The system of claim 1, wherein the water flow regulator further comprises a nipple that is configured to insert into the tube.

7. The system of claim 1, wherein the water flow regulator prevents a pressure head from being formed in the tube.

8. A method, comprising:
   receiving, via a water inlet of a toilet fill valve, water from a water supply;
   providing, via a tank water outlet of the toilet fill valve, a first portion of the water to a toilet tank;
   providing, via a bowl fill outlet port of the toilet fill valve, a second portion of the water to a water flow regulator, wherein an extended portion of the toilet fill valve forms the bowl fill outlet port, wherein the extended portion is integrally molded with the toilet fill valve, wherein the water flow regulator is in contact with the extended portion of the toilet fill valve, wherein a portion of the water flow regulator inserts into the extended portion of the toilet fill valve and comes into contact with the extended portion of the toilet fill valve;
   restricting, using the water flow regulator, a flow of the second portion of the water;
   providing, via the water flow regulator, the second portion of the water to a tube that is in contact with the water flow regulator; and
   providing, via the tube, the second portion of the water to a toilet tank overfill tube.

9. The method of claim 8, wherein the water flow regulator prevents a pressure head from being formed in the tube.

10. The method of claim 8, further comprising terminating, using the toilet fill valve, the flow of the second portion of the water so that a water level in a toilet bowl is at a predefined level.

11. The method of claim 10, wherein the water level is determined at least in part by the water flow regulator.

12. The method of claim 8, wherein the extended portion of the toilet fill valve is a portion of a body of the toilet fill valve.

13. The method of claim 8, wherein the extended portion of the toilet fill valve extends radially from a longitudinal axis of the toilet fill valve.

14. A method, comprising:
inserting a portion of a water flow regulator into an extended portion of a body of a toilet fill valve, the portion of the water flow regulator coming into contact with the extended portion of the body of the toilet fill valve, wherein the extended portion is integrally molded with the body, wherein the extended portion forms a bowl fill outlet port, wherein the water flow regulator is configured to constrict a flow rate of water that flows out of the bowl fill outlet port; and
attaching a tube directly to the water flow regulator, wherein the tube is configured to direct the water from the water flow regulator directly to a toilet tank overflow tube.

15. The method of claim 14, further comprising preventing the water flow regulator from detaching from the extended portion of the body.

16. The method of claim 15, wherein preventing the water flow regulator from detaching from the extended portion further comprises clamping the water flow regulator to the extended portion.

17. The method of claim 15, wherein preventing the water flow regulator from detaching from the extended portion further comprises snapping the bowl fill restriction to the extended portion.

18. The method of claim 15, wherein preventing the water flow regulator from detaching from the extended portion further comprises rotating the water flow regulator relative to the extended portion.

19. The system of claim 1, wherein the water flow regulator comprises an adjustable water flow regulator that is configured to adjust the flow rate of the second portion of the water based at least in part on a setting of the adjustable water flow regulator.

20. The method of claim 14, wherein the water flow regulator comprises an adjustable water flow regulator that is configured to adjust the flow rate of the water based at least in part on a setting of the adjustable water flow regulator.

* * * * *